(12) United States Patent
Chung (10) Patent No.: US 7,303,064 B2
(45) Date of Patent: Dec. 4, 2007

(54) FEEDER BELT FOR STRIP-SHAPED PARTS

(75) Inventor: Jae Song Chung, Seoul (KR)

(73) Assignee: Jettech Ltd., Kyunggi-do (KR)

( * ) Notice: Subject to any disclaimer, the term of this patent is extended or adjusted under 35 U.S.C. 154(b) by 94 days.

(21) Appl. No.: 11/252,302

(22) Filed: Oct. 17, 2005

(65) Prior Publication Data

US 2006/0081445 A1    Apr. 20, 2006

(30) Foreign Application Priority Data

Oct. 19, 2004   (KR) .................. 10-2004-0083600
Jun. 17, 2005   (KR) .................. 10-2005-0052267

(51) Int. Cl.
*B65G 29/00*   (2006.01)

(52) U.S. Cl. .................. 198/803.7; 198/678.1; 198/803.3; 204/198; 204/202

(58) Field of Classification Search ............ 198/803.7, 198/678.1, 687.1, 803.3, 867.01; 204/198, 204/202
See application file for complete search history.

(56) References Cited

U.S. PATENT DOCUMENTS

| | | | |
|---|---|---|---|
| 4,534,843 A | | 8/1985 | Johnson et al. |
| 4,904,363 A | * | 2/1990 | Comp .................. 204/202 |
| 4,958,983 A | * | 9/1990 | Fisch .................. 414/795.3 |
| 5,024,745 A | | 6/1991 | Rischke et al. |
| 5,901,997 A | * | 5/1999 | Bayer .................. 294/115 |
| 6,149,791 A | * | 11/2000 | Roesener et al. .......... 205/122 |
| 6,290,227 B1 | * | 9/2001 | Reist .................. 271/277 |
| 7,128,817 B2 | * | 10/2006 | Choi .................. 204/206 |

* cited by examiner

*Primary Examiner*—Douglas A Hess
(74) *Attorney, Agent, or Firm*—Jordan and Hamburg LLP

(57) ABSTRACT

A feeder belt for strip-shaped parts used to feed the strip-shaped parts in various processes such as plating, deflashing, or other processes for manufacturing semiconductors or other articles at industrial scale. By improving the structure of a finger for a feeder belt including a belt body, the separation, fatigue, and the sliding of the finger during feeding of the strip-shaped parts is resolved. Since external force can be applied in the horizontal direction when loading and unloading the strip-shaped parts, peripheral devices are simplified.

9 Claims, 11 Drawing Sheets

FEEDER BELT FOR STRIP-SHAPED PARTS

BACKGROUND OF THE INVENTION

1. Field of the Invention

The present invention relates to a feeder belt for strip-shaped parts, and more particularly, to a feeder belt used to feed parts in various processes such as plating and deflashing among processes of manufacturing semiconductors or other devices.

2. Description of the Related Art

Among conventional feeder belts for strip-shaped parts, there are an integrated type feeder belt in which a belt body is integrally formed with a finger and a separated and coupled type feeder belt in which the belt body is separated from or coupled with the finger. U.S. Pat. No. 4,534,843 is a representative example of the integrated type feeder belt, and U.S. Pat. No. 5,024,745 is a representative example of the separated and coupled type feeder belt.

Figure 1:
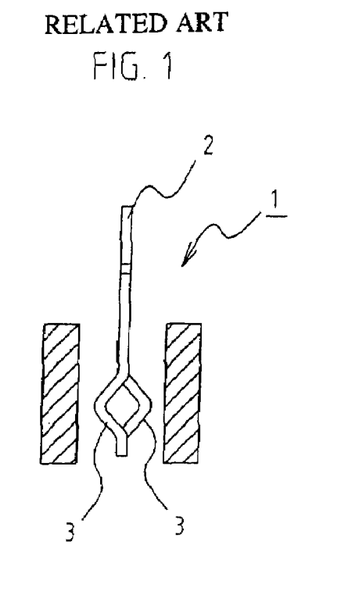
FIG. 1 is a view illustrating the conventional feeder belt for strip-shaped parts in which the loading or the unloading of the strip-shaped parts is not performed.
Figure 2:
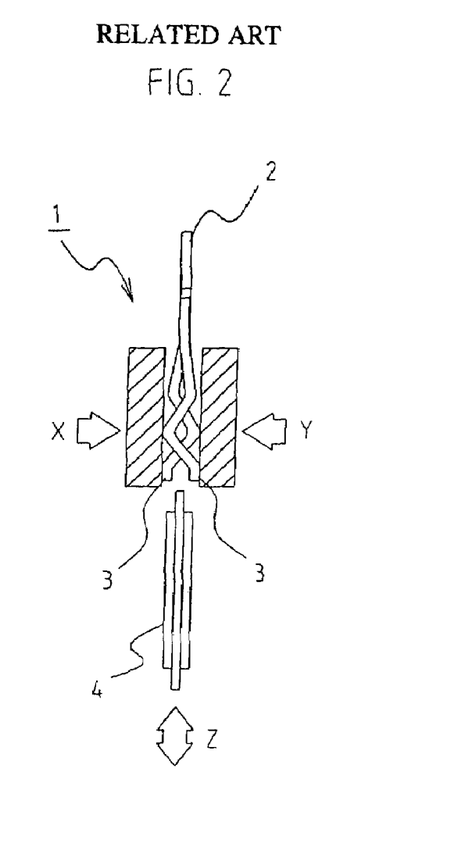
FIG. 2 is a view illustrating the conventional feeder belt for strip-shaped parts in a state directly before the loading or directly after the unloading of the strip-shaped parts.
Figure 3:
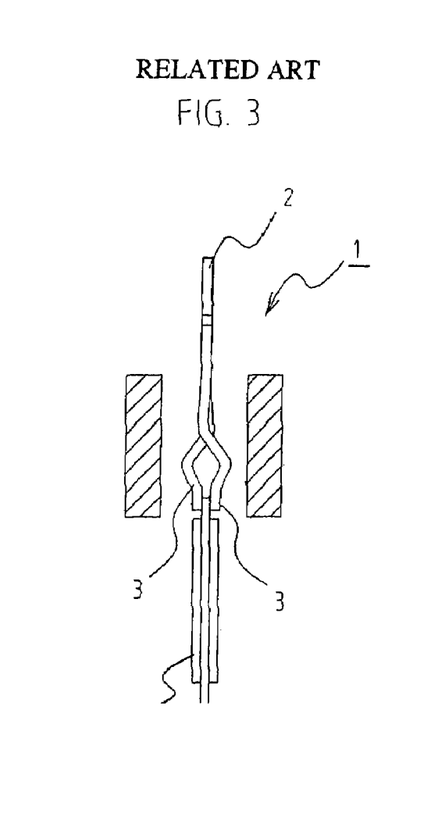
FIG. 3 is a side view of the conventional feeder belt for strip-shaped parts when the strip-shaped parts are loaded.

In the integrated type feeder belt 1 for strip-shaped parts, disclosed in U.S. Pat. No. 4,534,843, as shown in FIGS. 1 to 3, a belt boy 2 is integrally formed with a finger 3. In the integrated type feeder belt 1, when the finger 3 is damaged or loses elasticity so that the feeder belt 1 cannot be used further because its gripping power necessary for loading the parts 4 is weakened, replacement of the entire feeder belt 1 is necessary because the defective finger 3 cannot be separated and replaced. Since maintenance of the integrated type feeder belt 1 is difficult and its life span is short, it is ineffective and uneconomical. When loading and unloading the parts 4, the sides of the fingers 3 are simultaneously pressed in the horizontal pressing direction X and Y so as to form a space between the fingers 3, and a part 4 to be loaded or unloaded is lifted up or lowered down. However, since peripheral devices performing such operations are complex, the overall volume of equipment is large, and costs are increased, the integrated type feeder belt 1 is scarcely used recently.

Figure 4:
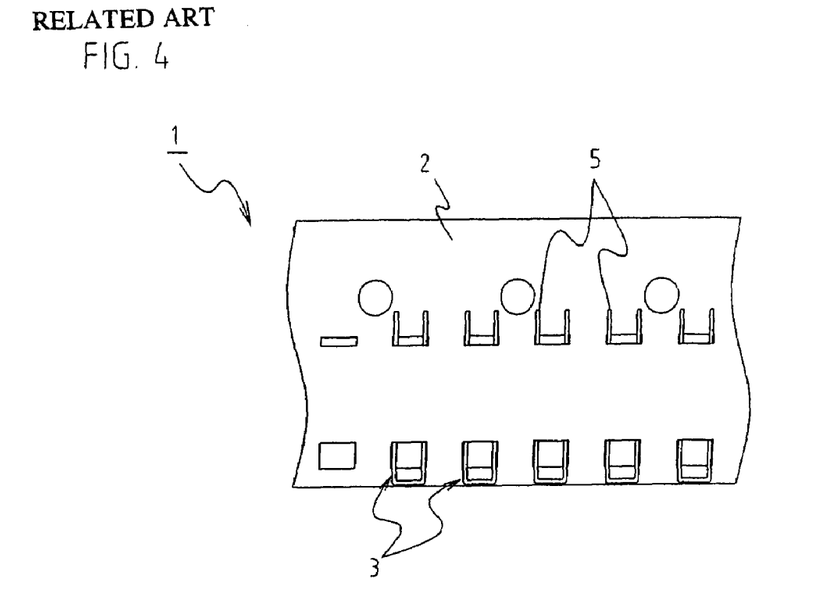
FIG. 4 is a partially cutaway front view of another conventional feeder belt for strip-shaped parts.
Figure 5:
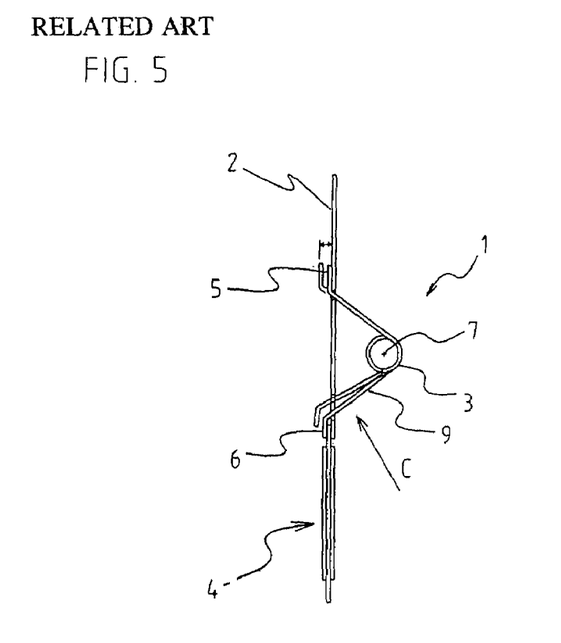
FIG. 5 is a partially cutaway side view of the conventional feeder belt for strip-shaped parts shown in FIG. 4.

The separated and coupled type feeder belt 1, disclosed in U.S. Pat. No. 5,024,745, as shown in FIGS. 4 and 5, is structured such that a belt body 2 and a finger 3 are manufactured independently and the finger 3 is installed in the belt body 2. In the separated and coupled type feeder belt, when loading and unloading the strip-shaped parts 4, since there is a structural shortcoming in that a side of the finger 3 is pressed in the upward pressing direction C, the finger 3 is frequently separated from the belt body 2 by the separation of the finger 3 from an installation part 5 of the belt body 2 positioned at the upper side of the finger 3. Moreover, the separated and coupled type feeder belt has disadvantages in that peripheral devices performing such operations are complex, the overall volume of equipment is large, and costs are increased, the frequency and likelihood of malfunction is high, and maintenance is difficult.

Particularly, due to the structure of coupling the finger 3 with the belt body 2, since a gripping part 6 of the finger 3, provided at the leading end of the finger 3 is pivoted upward about a hinge 7 due to a force applied in the upward direction C and pivoted in the reverse direction of the upward direction C when the finger 3 is returned to its original position, the part 4 is slid down or pushed together with the gripping part 6, causing unstable loading of the part 4, in the worst case, a serious situation such that the part 4 could be separated from the feeder belt 1 during feeding due to the unstable loading of the part 4, may be happened.

Figure 6:
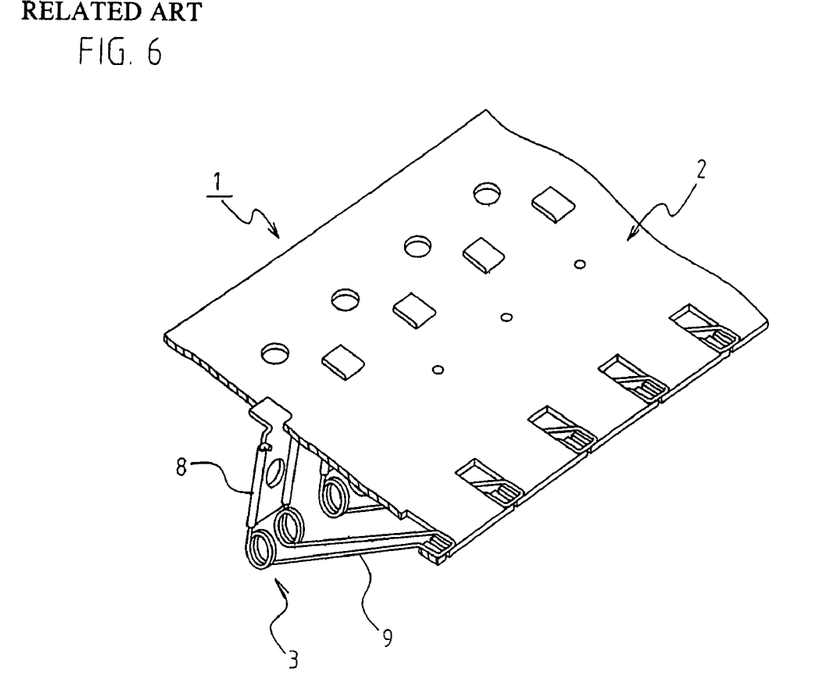
FIG. 6 is a partially cutaway perspective view of still another conventional feeder belt for strip-shaped parts.
Figure 7:
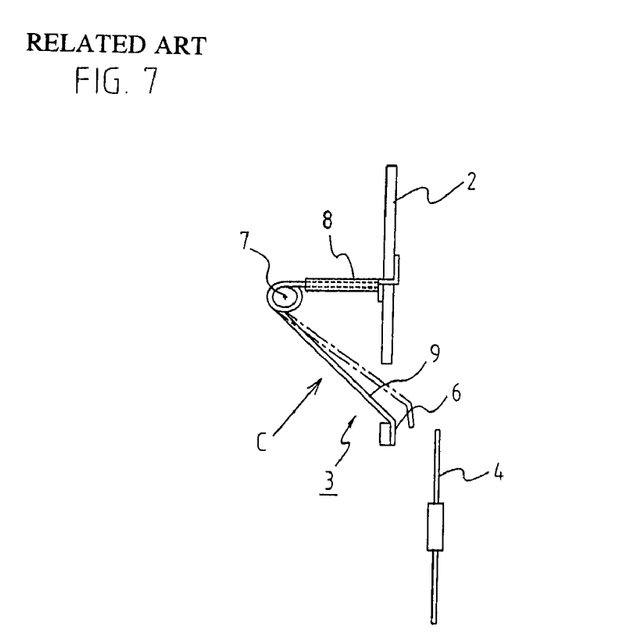
FIG. 7 is a partially cutaway side view of the conventional feeder belt for strip-shaped parts shown in FIG. 6.

In addition, a conventional feeder belt, as shown in FIGS. 6 and 7, is one of the separated and coupled type feeder belt in which a finger 3 is coupled with a belt body 2. However, since the finger 3 is manufactured such that a support 8 is made of a thin plate by pressing and an elastic support 9 is made by bending a wire, and the support 8 is coupled with the elastic support 9, the conventional feeder belt has a complex structure and requires a lot of materials so that costs for production are increased and uneconomic. Moreover, the fundamental problems of the conventional feeder belt shown in FIGS. 4 and 5, which result in malfunction during loading and unloading, have yet to be solved.

Figure 8:
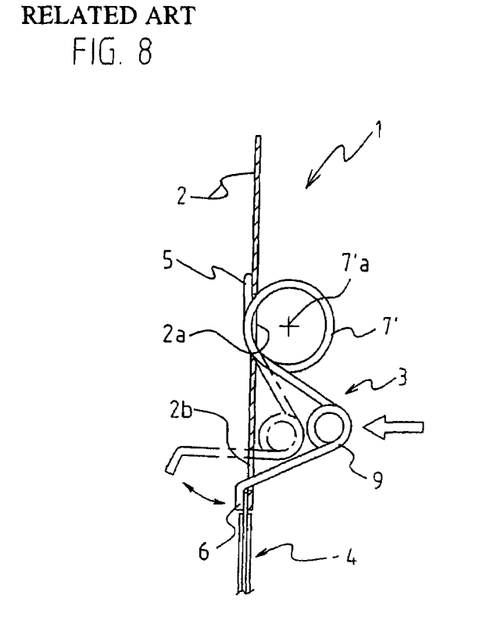
FIG. 8 is a partially cutaway side view illustrating still another conventional feeder belt for strip-shaped parts.
Figure 9:
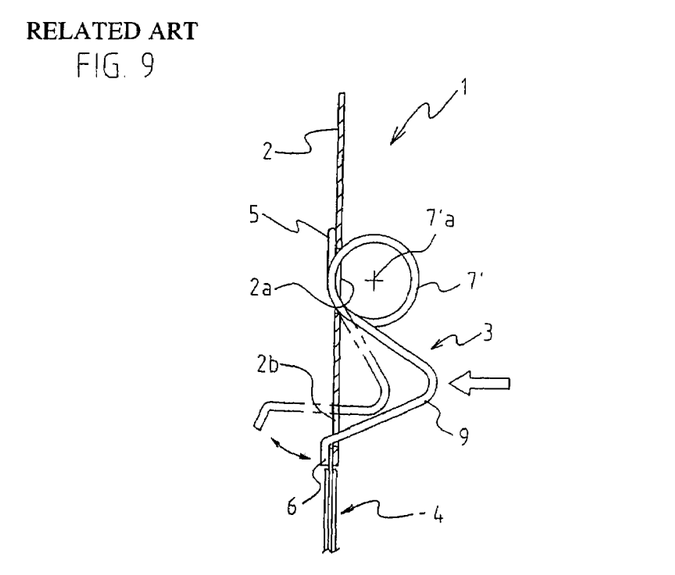
FIG. 9 is a partially cutaway side view illustrating still another conventional feeder belt for strip-shaped parts.

The conventional feeder belt shown in FIGS. 8 and 9 is the separated and coupled type feeder belt, wherein a finger 3 has an installation part 5 and a gripping part 6 formed at the ends thereof and an elastic hinge 7' and a direction changing part 9' formed between the installation part 5 and the gripping part 6 and respectively inserted into an installation hole 2a and opening 2b. According to the finger 3, the gripping part 6 is opened and closed by pressing and releasing the direction changing part 9' in the horizontal direction when loading and unloading the parts so that peripheral devices are simply structured. However, the conventional feeder belt has the following disadvantages.

First, in connection with the coil spring-shaped elastic hinge 7' of the finger 3, since the direction changing part 9' is pressed in the forward direction when loading and unloading the parts 4, the coil spring-shaped elastic hinge 7' is not pressed repeatedly in the direction of winding the coil spring-shaped elastic hinge 7' but in the direction of forcing the coil spring-shaped elastic hinge 7' to be released. For the above reasons, the finger 3, made of an elastic wire, undergoes fatigue so that the finger 3 is easily broken and its life span becomes shorter.

Secondly, since the direction changing part 9' of the finger 3, regardless of being made in the form of a spring or simply being bent, connects the installation part 5 to the gripping part 6 via the elastic hinge 7', the direction changing part 9' simply integrates the elastic hinge 7' and the gripping part 6 with the finger 3 to form an angle therebetween.

Thirdly, since the feeder belt has the elastic installation function of coupling the finger 3 with the belt body 2 when the elastic hinge 7' of the finger 3 is installed in the installation hole 2a of the belt body 2, and the elastic gripping function of generating gripping power of the gripping part 6 when the gripping part 6 is pivoted about the center 7'a of the elastic hinge 7', i.e. since the feeder belt is structured such that the installation function and the gripping function are simultaneously applied to a portion of the elastic hinge 7' and the functions or effects are exhibited during the operation of the finger 3, it is difficult to balance the functions during the operation of the finger 3, so that smooth operation of the finger 3 cannot be achieved.

SUMMARY OF THE INVENTION

Therefore, the present invention has been made in view of the above and/or other problems, and it is an object of the present invention to provide a feeder belt for strip-shaped parts in which a supporting and fixing part to securely and elastically install a finger to a belt body is separated from a pivot hinge to serve as a hinge for allowing a gripping part to pivot and to generate gripping force so that independent, durable, smooth, and precise operations of the supporting and fixing part and the pivot hinge can be achieved.

It is another object of the present invention to provide a feeder belt for strip-shaped parts in which external force is not applied to a spring-shaped pivot hinge in the reverse direction of unwinding the pivot hinge but in the forward direction of winding the pivot hinge when the a gripping part is pressed and released for the opening and closing of the gripping by the external force, and a diameter of a wound spring part of the pivot hinge for opening and closing the gripping part is gradually decreased towards the position where the pivot hinge is connected to the gripping part so that fatigue caused by the pivot hinge is prevented and the life span of a finger is remarkably increased.

It is still another object of the present invention to provide a feeder belt for strip-shaped parts in which a finger is integrally made of a wire, the loading and the unloading of the strip-shaped parts can be achieved by horizontally pressing the finger such that the finger and peripheral devices are simplified, it is convenient to manufacture the finger, manufacturing costs are reduced, and maintenance is convenient.

It is still another object of the present invention to provide a feeder belt for strip-shaped parts in which the structure that a portion between an installation part and a supporting and fixing part of a finger are inserted into an upper stepped part of an installation hole of a belt body is improved so that the finger is securely fixed to the belt body when pressing or releasing the finger for the loading and the unloading of the strip-shaped parts, and the finger for loading and unloading the strip-shaped parts is horizontally pressed when loading and unloading the strip-shaped parts to prevent the strip-shaped parts from being slid or pushed by a gripping part of the finger.

In accordance with the present invention, the above and other aspects can be accomplished by the provision of a feeder belt for strip-shaped parts used to feed the strip-shaped parts in an in-line process in which various processes such as plating, deflashing, or the like, among processes for manufacturing semiconductors or other articles at industrial scale, and comprising a plurality of independently manufactured fingers installed to a belt body at regular pitches, the feeder belt including: a belt body including: installation holes for coupling installation parts and supporting and fixing parts of fingers; and openings formed at the lower sides of the installation holes into which gripping parts of the fingers are movably inserted. Each of the fingers includes the installation part formed at the end of the finger; the supporting and fixing part adjacent to the installation part and coupled with the installation hole by a part of the supporting and fixing part to elastically support the belt body and the finger; a coupling recess formed between the installation part and the supporting and fixing part and inserted into the installation hole of the belt body; a spring-shaped pivot hinge, adjacent to the supporting and fixing part, for transmitting an elastic gripping force to the gripping part and serving as a hinge; and the gripping part adjacent to the pivot hinge and formed by bending the end of the finger to be inserted into the opening of the belt body; wherein the installation part, the supporting and fixing part, the coupling recess, the pivot hinge, and the gripping part are integrally formed into the finger.

Preferably, the finger is made of an elastic wire, and the installation part, the supporting and fixing part, the pivot hinge, and the gripping part are integrally connected to each other, and winding directions of wound coil spring portions of the supporting and fixing part and the pivot hinge are opposite to each other. The finger includes respective pairs of the installation parts, the coupling recesses, the supporting and fixing parts, the pivot hinges, and the gripping parts facing each other by connecting two installation parts to each other. The finger includes an installation part, a coupling recess, a supporting and fixing part, a pivot hinge, and a gripping part, which are integrally connected to each other.

The finger is formed such that the installation part, the supporting and fixing part, the pivot hinge, and the gripping part are integrally connected to each other, while the diameter of the pivot hinge is greater than the diameter of the supporting and fixing part, and a side of the pivot hinge contacts the side of the belt body. The portion between the pivot hinge and the bent gripping part is bent so that an external force can be applied in the horizontal direction.

In accordance with the present invention, the above and other aspects can be accomplished by the provision of a feeder belt for strip-shaped parts used to feed the strip-shaped parts in an in-line process in which various processes such as plating, deflashing, or the like among processes for manufacturing semiconductors or other articles on an industrial scale, and respectively having a plurality of independently manufactured fingers installed to a belt body at regular pitches, the feeder belt including: a belt body including: installation holes for coupling installation parts and supporting and fixing parts of fingers; and openings formed at the lower sides of the installation holes into which gripping parts of the fingers are movably inserted. Each of the fingers includes: the installation part formed at the end of the finger; the supporting and fixing part adjacent to the installation part and coupled with the installation hole by a part of the supporting and fixing part to elastically support the belt body and the finger; a coupling recess formed between the installation part and the supporting and fixing part and inserted into the installation hole of the belt body; a spring-shaped pivot hinge adjacent to the supporting and fixing part to transmit an elastic gripping force to the gripping part and to serve as a hinge and to have a multiple winding spring-shaped portion, a diameter of which decreases towards a portion connected to the gripping part; and the gripping part adjacent to the pivot hinge and formed by bending the end of the finger to be inserted into the opening of the belt body; wherein the installation part, the supporting and fixing part, the coupling recess, the pivot hinge, and the gripping part are integrally formed into the finger.

BRIEF DESCRIPTION OF THE DRAWINGS

These and/or other aspects and advantages of the present invention will become apparent and more readily appreciated from the following description of the embodiments, taken in conjunction with the accompanying drawings, in which:

FIGS. 1 to 3 are views illustrating a conventional feeder belt for strip-shaped parts, in which:

FIGS. 4 and 5 are views illustrating another conventional feeder belt for strip-shaped parts, in which:

FIGS. 6 and 7 are views illustrating still another conventional feeder belt for strip-shaped parts, in which:

DESCRIPTION OF THE PREFERRED EMBODIMENTS

Hereinafter, the preferred embodiments of the feeder belt for strip-shaped parts according to the present invention will be described in detail with reference to the accompanying drawings.

Feeder belts for strip-shaped parts according to the preferred embodiments, as shown in FIGS. 10 to 23, are commonly used to feed the strip-shaped parts in an in-line process in which various processes such as plating, deflashing, or the like, among processes of manufacturing semiconductors or other articles on an industrial scale, and respectively have a plurality of independently manufactured fingers installed to a belt body at regular pitches. A belt body 20 has installation holes 22 for coupling installation parts 32 and supporting and fixing parts 34 of fingers 30, and openings 24 formed at the lower sides of the installation holes 22 into which gripping parts 38 of the fingers 30 are movably inserted. Each of the fingers 30 includes an installation part 32 formed at the end thereof, a supporting and fixing part 34 adjacent to the installation part 32 and coupled with the installation hole 22 by a part of the supporting and fixing part 34 to elastically support the belt body 20 and the finger 30, a coupling recess 33 formed between the installation part 32 and the supporting and fixing part 34 and inserted into the installation hole 22 of the belt body 20, a spring-shaped pivot hinge 36, adjacent to the supporting and fixing part 34, for transmitting an elastic gripping force to the gripping part 38 and for serving as a hinge, and the gripping part 38 adjacent to the pivot hinge 36 and formed by bending the end of the finger 30 to be inserted into the opening 24 of the belt body 20, wherein the installation part 32, the supporting and fixing part 34, the coupling recess 33, the pivot hinge 36, and the gripping part 38 are integrally formed into the finger 30.

Figure 10:
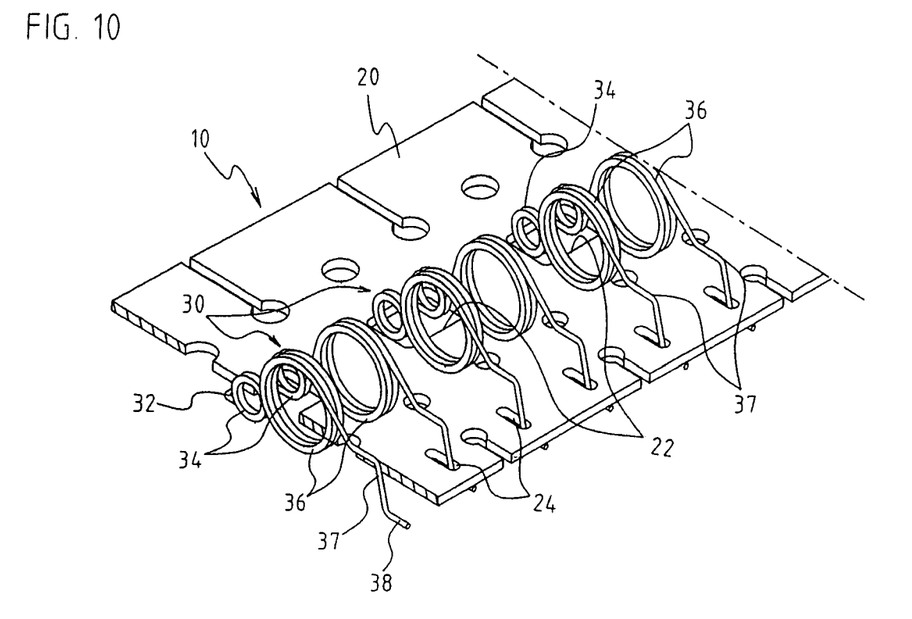
FIG. 10 is a partially cutaway perspective view illustrating a feeder belt for strip-shaped parts according to a preferred embodiment of the present invention.
Figure 11:
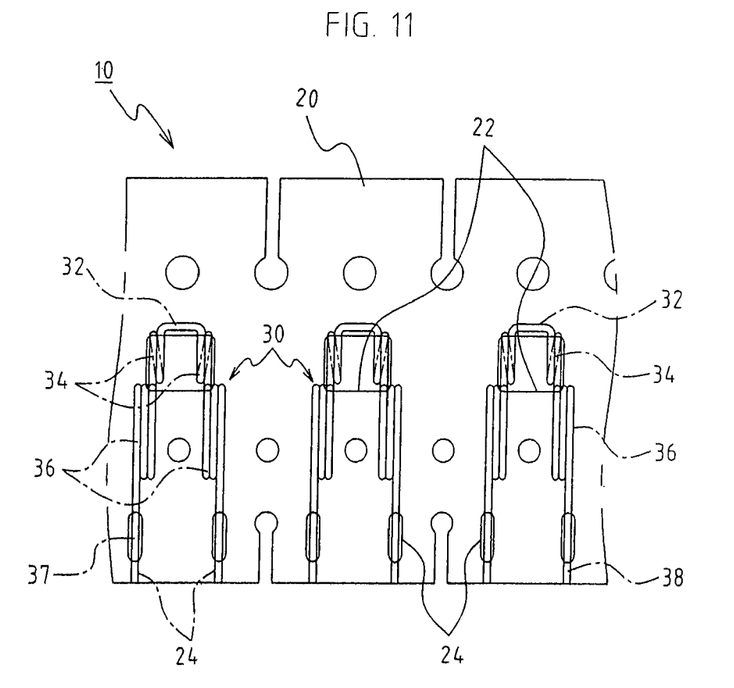
FIG. 11 is a plane view of the feeder belt for strip-shaped parts shown in FIG. 10.
Figures 12, 13:
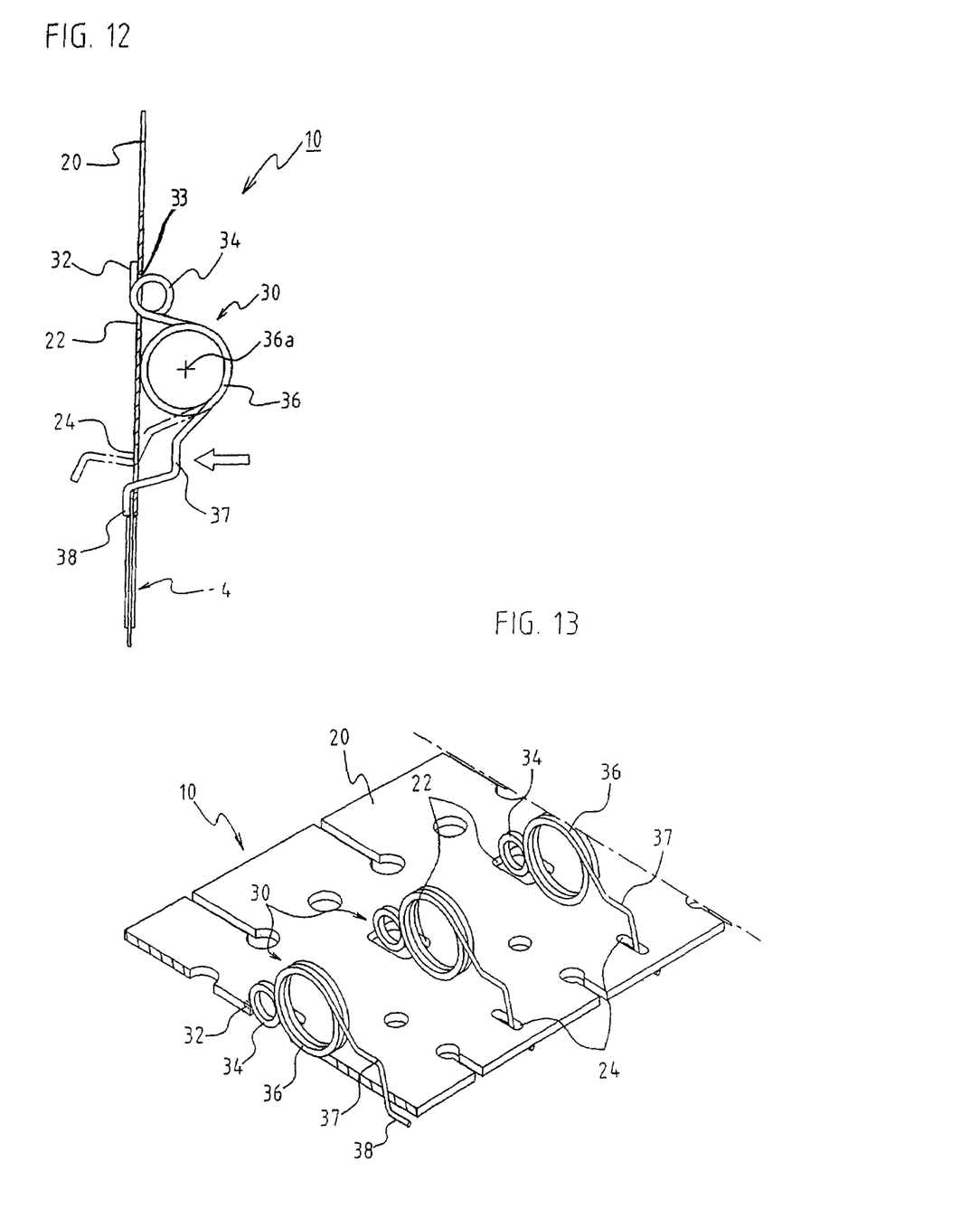
FIG. 12 is a partially cutaway side view illustrating an operational state of the feeder belt for strip-shaped parts shown in FIG. 10.
FIG. 13 is a partially cutaway perspective view illustrating a feeder belt for strip-shaped parts according to another preferred embodiment of the present invention.
Figure 14:
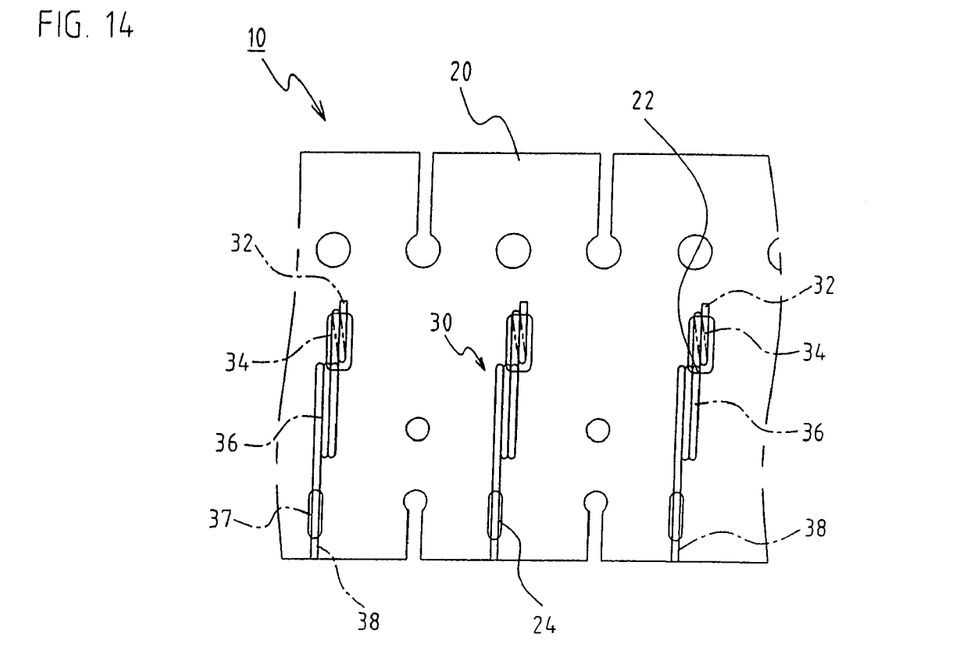
FIG. 14 is a plane view of the feeder belt for strip-shaped parts shown in FIG. 13.

The finger 30 is made of an elastic wire, and the installation part 32, the supporting and fixing part 34, the pivot hinge 36, and the gripping part 38 are integrally connected to each other. The supporting and fixing part 34 takes the form of a coil spring or a simple bent shape. In a spring-shaped supporting and fixing part 34, winding directions of the supporting and fixing part 34 and the pivot hinge 36 are opposite to each other. Moreover, the finger 30, as shown in FIGS. 10 to 12, includes respective pairs of the installation parts 32, the coupling recesses 33, the supporting and fixing parts 34, the pivot hinges 36, and the gripping parts 38 facing each other by connecting two installation parts 32 to each other. Otherwise, the finger 30, as shown in FIGS. 13 and 14, includes an installation part 32, a coupling recess 33, a supporting and fixing part 34, a pivot hinge 36, and a gripping part 38, which are integrally connected to each other.

In the finger 30, as shown in FIGS. 10 to 19, the installation part 32, the supporting and fixing part 34, the pivot hinge 36, and the gripping part 38 are integrally connected to each other, while the diameter of the pivot hinge 36 is greater than the diameter of the supporting and fixing part 34. Preferably, as shown in FIGS. 10 to 16, a side of the pivot hinge 36 contacts the side of the belt body 20 so that the gripping part 38 is smoothly actuated. Moreover, as shown in FIGS. 10 to 14, and 17, a bent pressing part 37 is disposed between the pivot hinge 36 and the gripping part 38 to easily apply external force in the horizontal direction.

Figure 15:
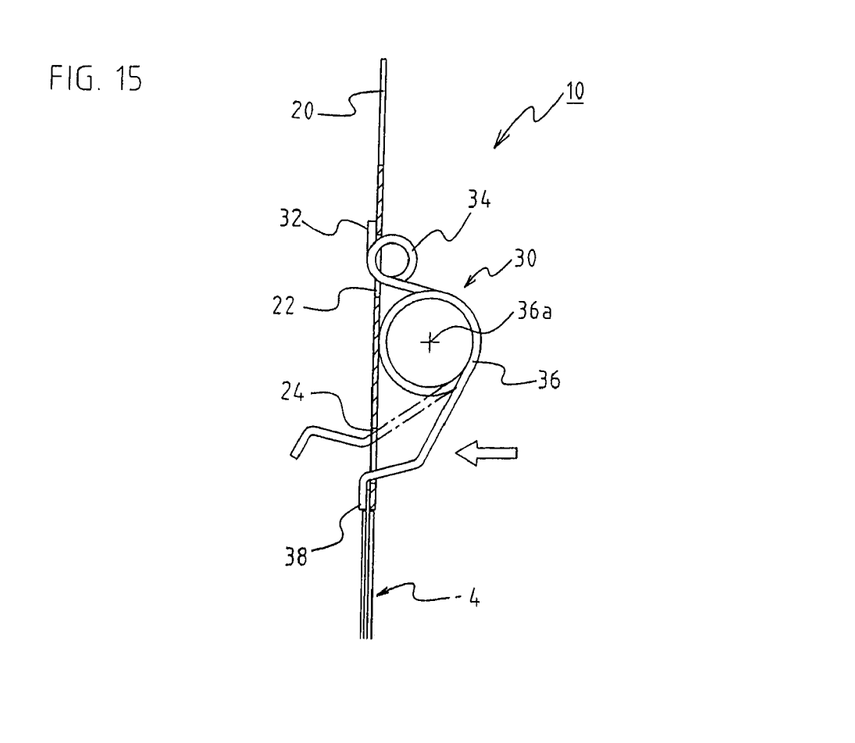
FIG. 15 is a partially cutaway side operational view illustrating a feeder belt for strip-shaped parts according to still another preferred embodiment of the present invention.
Figure 16:
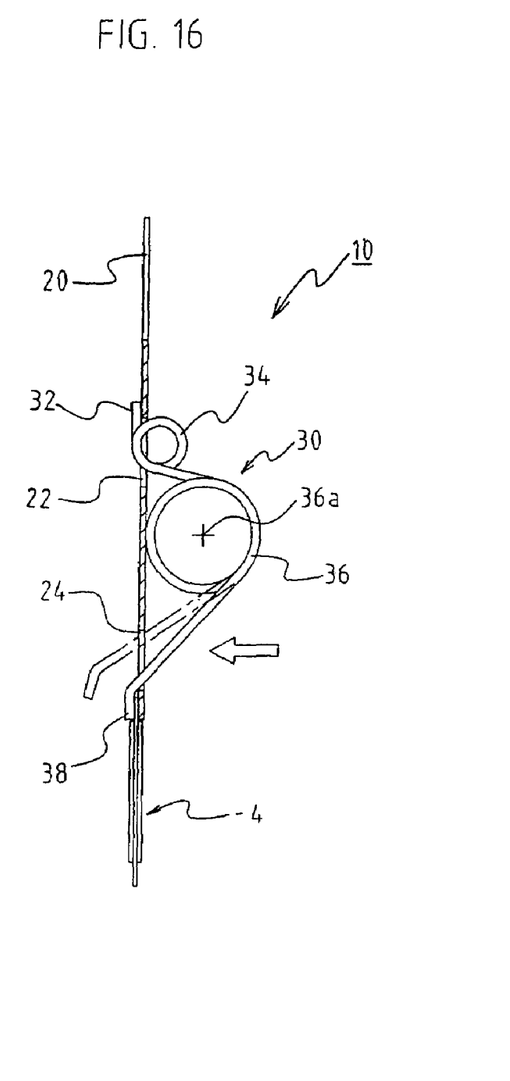
FIG. 16 is a partially cutaway side operational view illustrating a feeder belt for strip-shaped parts according to still another preferred embodiment of the present invention.
Figure 17:
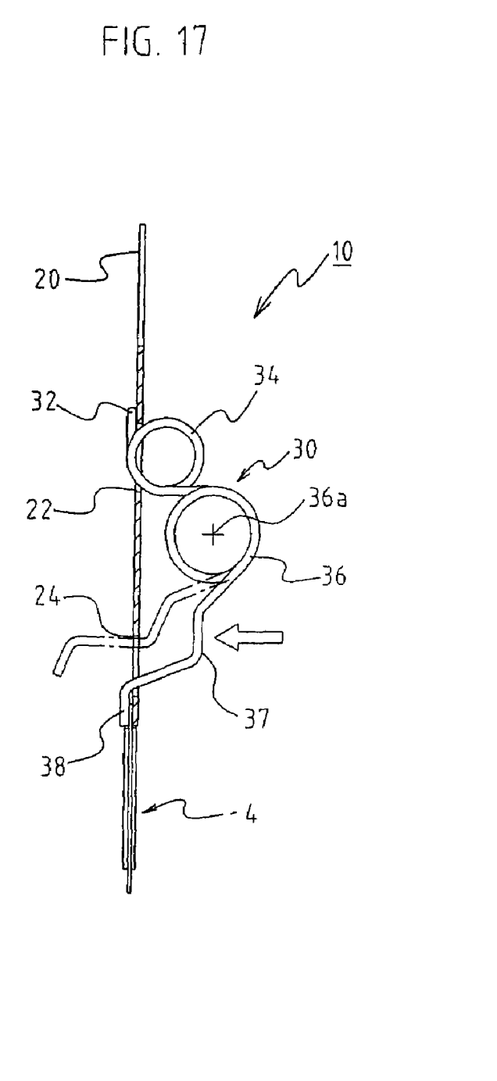
FIG. 17 is a partially cut side operational view illustrating a feeder belt for strip-shaped parts according to still another preferred embodiment of the present invention.
Figure 18:
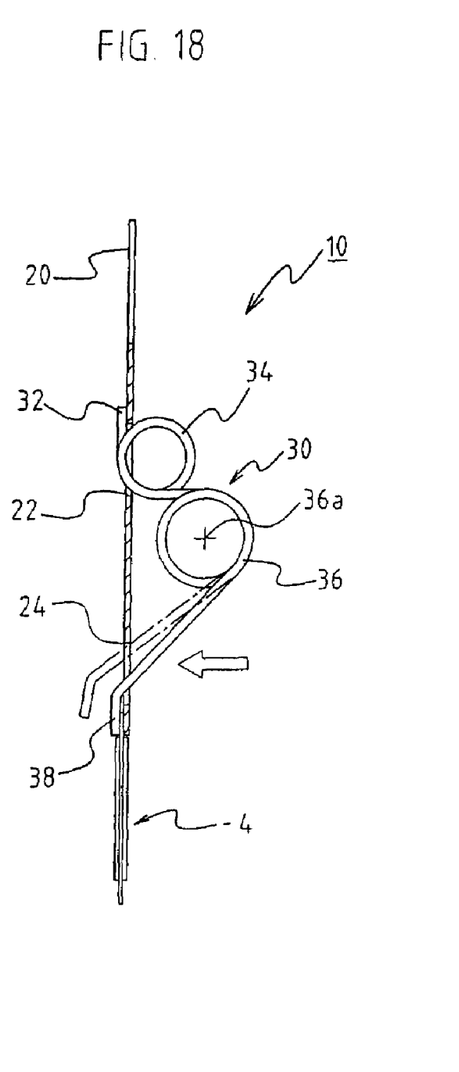
FIG. 18 is a partially cutaway side operational view illustrating a feeder belt for strip-shaped parts according to still another preferred embodiment of the present invention.
Figure 19:
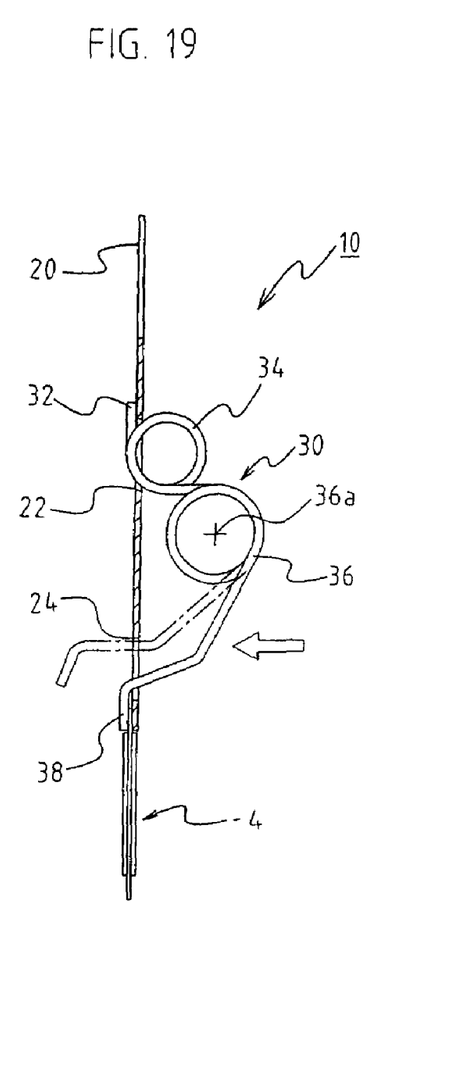
FIG. 19 is a partially cutaway side operational view illustrating a feeder belt for strip-shaped parts according to still another preferred embodiment of the present invention.
Figure 20:
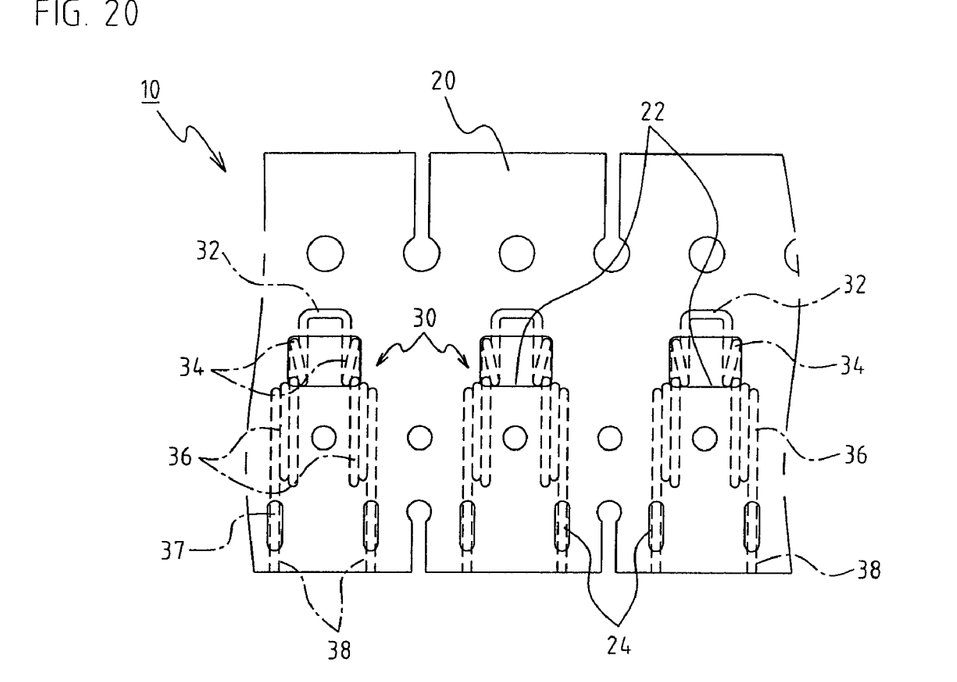
FIG. 20 is a plane view illustrating a feeder belt for strip-shaped parts according to still another preferred embodiment of the present invention.
Figure 21:
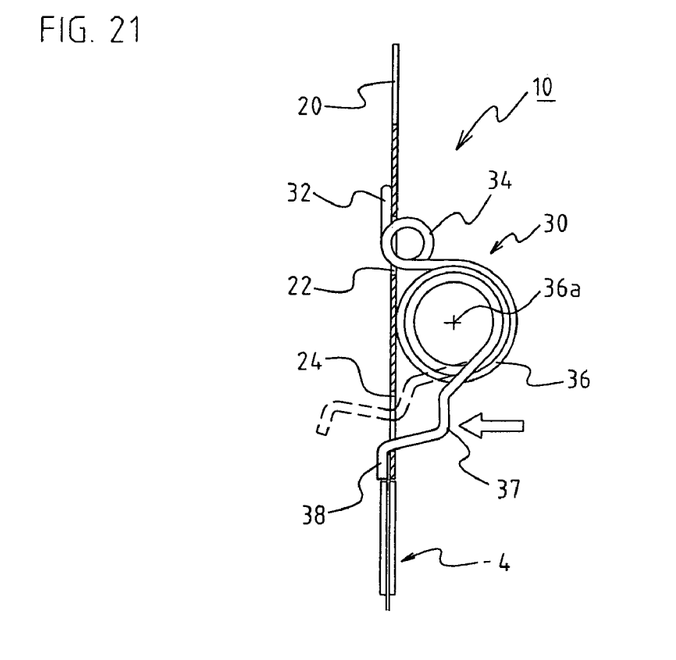
FIG. 21 is a partially cutaway side operational view illustrating a feeder belt for strip-shaped parts shown in FIG. 20.
Figure 22:
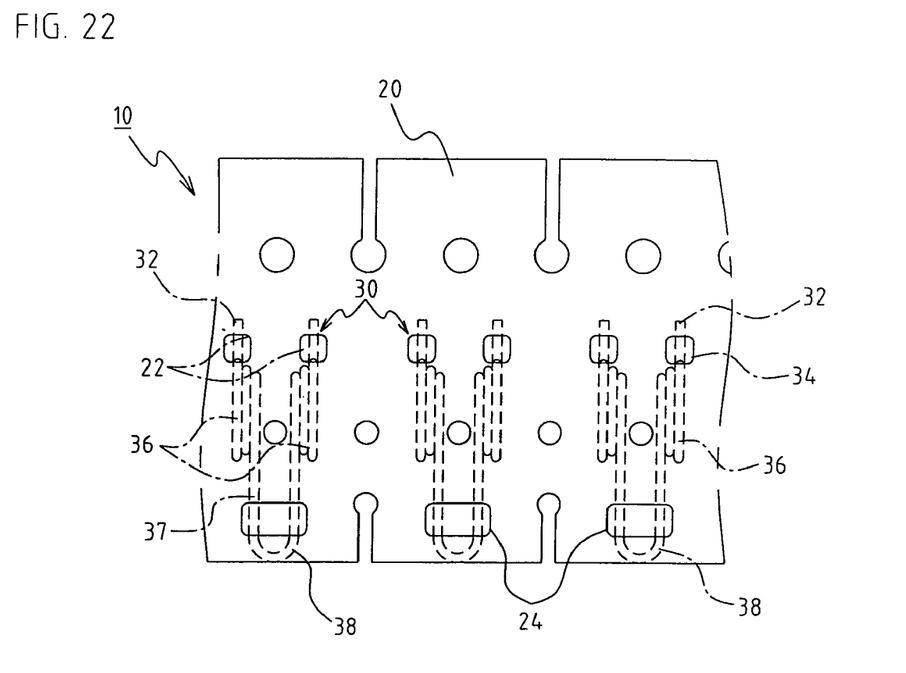
FIG. 22 is a plane view illustrating a feeder belt for strip-shaped parts according to still another preferred embodiment of the present invention.
Figure 23:
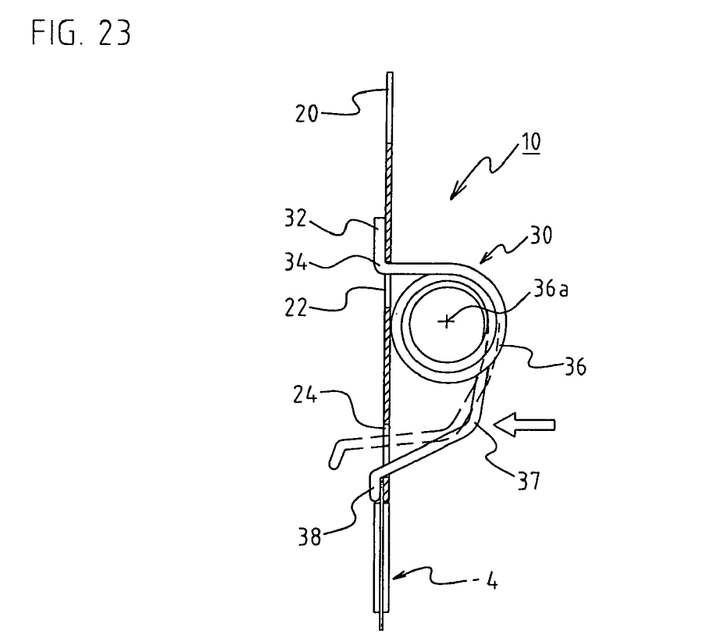
FIG. 23 is a partially cut side operational view illustrating a feeder belt for strip-shaped parts shown in FIG. 22.

The finger 30 can take various forms such that, as shown in FIGS. 17 to 19, the gripping part 38 is actuated in a state that a side of the pivot hinge 36 is spaced apart from the belt body 20, as shown in FIGS. 15 and 19, the portion between the pivot hinge 36 and the bent gripping part 38 is bent so that external force can be applied in the horizontal direction, or as shown in FIGS. 16 and 18, the portion between the pivot hinge 36 an the bent gripping part 38 is straight.

Preferably, as shown in FIGS. 20 to 23, the pivot hinge 36 is structured such that diameter of the multiple-winding spring-shaped portion of the pivot hinge 36 is decreased towards the gripping part 38.

Reference numeral 36a indicates a virtual center of the pivot hinge 36 of the finger 30.

The feeder belt for strip-shaped parts according to the present invention is operated as follows.

When the belt body 20 is coupled with the finger 30 so that the feeder belt 10 is completed, the installation part 32 and a part of the supporting and fixing part 34 of the finger 30 are inserted into the installation hole 22 formed in the belt body 20, the upper side of the installation hole 22 is inserted into the coupling recess 33 formed between the installation part 32 and the supporting and fixing part 34 of the finger 30, and the gripping part 38 of the finger 30 is inserted into the opening formed below the installation hole 22 of the belt body 20 so that the finger 30 is coupled with the belt body 20.

As such, the fingers 30 are coupled with the installation holes 22 and the openings 24 of the belt body 20 in regular pitches so as to complete the feeder belt 10. At that time, the finger 30 coupled with the belt body 20 is securely inserted into the installation hole 22 by means of the coupling recess 33 and the gripping part 38 is elastically supported by the lower side of the opening 24 so that the finger 30 is elastically supported and coupled with the belt body 20 by the supporting and fixing part 34 and the gripping part 38 is elastically opened and closed about the hinge center 36a due to the spring-shaped pivot hinge 36.

The loading of the strip-shaped parts 4 is performed as follows. As shown in FIGS. 12 and 15 to 19, when the finger 30 is pressed in the horizontal direction, a sufficient space for loading the strip-shaped parts 4 is secured between the belt body 20 and the gripping part 38. At that time, a strip-shaped part 4 to be loaded is positioned in the loading space and the finger 30 is released so that the gripping part 38 is returned to its original position and the strip-shaped part 4 is gripped between the belt body 20 and the gripping part 38, i.e. the loading state is maintained.

At that time, since the separation of the gripping part 38 from the belt body 20 by pressing the finger 30 and the loading of the strip-shaped parts 4 performed by releasing the pressed finger 30 to restore the gripping part 38 to the belt body 20 are performed by pressing and releasing the finger 30 in the horizontal direction, the strip-shaped part 4 is not lowered and the loading of the strip-shaped part 4 is securely performed.

When unloading the strip-shaped parts 4, conversely to the loading of the strip-shaped parts 4, the separation of the gripping part 38 from the belt body 20 by pressing the finger 30 in the horizontal direction, the unloading of the strip-shaped part 4 such that the strip-shaped part 4 falls due to the separation of the gripping part 38, and the restoring of the gripping part 38 due to the releasing of the finger 30 are sequentially performed.

The pivot hinge 36 for opening and closing the gripping part 38 is formed such that the diameter of the multiple winding spring-shaped portion thereof is decreased towards the portion connected to the gripping part 38 so that the spring-shaped portion of the pivot hinge 36 farthest from the portion connected to the gripping part 38 and connected to the supporting and fixing part 34 has the largest diameter, thereby contacting the surface of the belt body 20. However, other portions do not contact the belt body 20 so that the gripping part 38 is smoothly opened and closed. Thus, balance and distribution of forces are achieved due to the spring, the feeder belt for strip-shaped parts is smoothly operated, and life span thereof is prolonged.

As described above, according to the feeder belt for strip-shaped parts of the present invention, when the finger 30 is coupled with the belt body 20, the finger 30 is securely and elastically installed to the belt body 20, the installation part 32, the coupling recess 33, the supporting and fixing part 34, and the pivot hinge 36 for serving as a hinge for pivoting the gripping part 38 of the finger 30 and for generating the elastic gripping force of the gripping part 38 are formed as independent elements so that the installation part 32, the coupling recess 33, the supporting and fixing part 34, and the pivot hinge 36 are independently operated. Moreover, the installation part 32, the coupling recess 33, the supporting and fixing part 34, and the pivot hinge 36 have considerable endurance and are smoothly and precisely operated.

In addition, according the feeder belt for strip-shaped parts of the present invention, during the pressing and releasing for the opening and closing of the gripping part 38, external force is not applied to the spring-shaped pivot hinge 36 in the direction of unwinding the pivot hinge 36 but in the direction of winding the pivot hinge 36. If necessary, the diameter of the multiple winding spring-shaped portion of the pivot hinge 36 for opening and closing the gripping part 38 is decreased towards the portion connected to the gripping part 38 so that fatigue generated from the pivot hinge 38 during the opening and closing operations is prevented so that life span of the finger 30 is remarkably prolonged. Since the finger 30 is integrally formed by being made of a wire and the finger 30 and the peripheral devices are simplified such that the strip-shaped parts can be loaded and unloaded by pressing the finger 3 in the horizontal direction, the feeder belt is easily manufactured, costs for manufacturing the feeder belt are reduced, and the maintenance of the feeder belt is convenient.

Moreover, according to the feeder belt for strip-shaped parts of the present invention, the finger 30 is coupled with the belt body 20 such that the coupling recess 33 having an acute angle is improved so that the stepped portion of the installation hole 22 of the belt body 20 is inserted into the portion between the installation part 32 and the supporting and fixing part 34. Thus, the finger 30 is prevented from being separated from the belt body 20 when the finger 30 is pressed or released for the loading and unloading of the strip-shaped parts 4. In addition, the finger 30 is pressed in the horizontal direction when loading and unloading the strip-shaped parts 4 so that the strip-shaped parts 4 are securely prevented from being slid or pushed by the gripping part 38 of the finger 30.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A feeder belt for strip-shaped parts used to feed the strip-shaped parts in an in-line process in which various processes such as plating, deflashing, or other processes for manufacturing semiconductors or other articles at industrial scale, the feeder belt comprising:
   a belt body; and
   a plurality of fingers, the fingers being independently manufactured and installed to the belt body at regular pitches,
   wherein the belt body has installation holes for coupling installation parts and supporting and fixing parts of the fingers, and openings formed at lower sides of the installation holes into which gripping parts of the fingers are movably inserted, and wherein each finger comprises the installation part, a coupling recess, the supporting and fixing part, a pivot hinge, and the gripping part, the installation part formed at the end of the finger, the supporting and fixing part adjacent to the installation part and coupled with the installation hole by a part of the supporting and fixing part to elastically support the belt body and the finger, the coupling recess formed between the installation part and the supporting and fixing part and inserted into the installation hole of the belt body, the pivot hinge being spring-shaped and having a diameter greater than a diameter of the supporting and fixing part, the pivot hinge being adjacent to the supporting and fixing part, the pivot hinge being for transmitting an elastic gripping force to the gripping part and serving as a hinge, and the gripping part adjacent to the pivot hinge and formed by bending the end of the finger to be inserted into the opening of the belt body.

2. The feeder belt for strip-shaped parts as set forth in claim 1, wherein each finger is made of an elastic wire, and winding directions of wound coil spring portions of the supporting and fixing part and the pivot hinge are opposite to each other.

3. The feeder belt for strip-shaped parts as set forth in claim 1 or 2, wherein each finger includes respective pairs of the installation parts, the coupling recesses, the supporting and fixing parts, the pivot hinges, and the gripping parts facing each other by connecting two installation parts to each other.

4. The feeder belt for strip-shaped parts as set forth in claim 1 or 2, wherein the installation part, the coupling recess, the supporting and fixing part, the pivot hinge, and the gripping part of each finger are integrally connected to each other.

5. The feeder belt for strip-shaped parts as set forth in claim 1 or 2, wherein, each finger is formed such that the installation part, the supporting and fixing part, the pivot hinge, and the gripping part are integrally connected to each other, and a side of the pivot hinge is in contact with a side of the belt body.

6. The feeder belt for strip-shaped parts as set forth in claim 1 or 2, wherein each finger is formed such that the installation part, the supporting and fixing part, the pivot hinge, and the gripping part are integrally connected to each other, and a side of the pivot hinge is spaced apart from the belt body.

7. The feeder belt for strip-shaped parts as set forth in claim 1 or 2, wherein a portion between the pivot hinge and the bent gripping part is bent so that an external force can be applied in the horizontal direction.

8. A feeder belt for strip-shaped parts used to feed the strip-shaped parts in an in-line process in which various processes such as plating, deflashing, or other processes for manufacturing semiconductors or other articles at industrial scale, the feeder belt comprising:
   a belt body; and
   a plurality of fingers, the fingers being independently manufactured and installed to the belt body at regular pitches, wherein the belt body has installation holes for coupling installation parts and supporting and fixing parts of the fingers, and openings formed at lower sides of the installation holes into which gripping parts of the fingers are movably inserted, wherein each finger comprises the installation part, a coupling recess, the supporting and fixing part, a pivot hinge, and the gripping part, the installation part formed at the end of the finger, the supporting and fixing part adjacent to the installation part and coupled with the installation hole by a part of the supporting and fixing part to elastically support the belt body and the finger, the coupling recess formed between the installation part and the supporting and fixing part and inserted into the installation hole of the belt body, the pivot hinge being spring-shaped and having multiple windings, a diameter of the windings decreasing towards a portion connected to the gripping part, a maximum diameter of the windings greater than a diameter of the supporting and fixing part, the pivot hinge being adjacent to the supporting and fixing part, to transmit an elastic gripping force to the gripping part and to serve as a hinge, and the gripping part adjacent to the pivot hinge and formed by bending the end of the finger to be inserted into the opening of the belt body, and wherein the installation part, the supporting and fixing part, the coupling recess, the pivot hinge, and the gripping part are integrally formed into the finger.

9. A finger for a feeder belt for strip-shaped parts comprising:
   an installation part formed at an end of the finger;
   a supporting and fixing part adjacent to the installation part;
   a coupling recess formed between the installation part and the supporting and fixing part;
   a spring-shaped pivot hinge having a diameter greater than a diameter of the supporting and fixing part, the pivot hinge being adjacent to the supporting and fixing part, for transmitting an elastic gripping force to the gripping part and serving as a hinge; and
   a gripping part adjacent to the pivot hinge and formed by bending an end of the finger to be inserted into an opening of a belt body,
   wherein the installation part, the supporting and fixing part, the coupling recess, the pivot hinge, and the gripping part are integrally formed into the finger.

* * * * *